Feb. 17, 1953

W. H. SCRIBNER 2,628,376

EGG WASHER AND DRIER

Filed Oct. 22, 1949

INVENTOR:
WILLIAM HARRY SCRIBNER.
BY
Robert V. Morse
ATTORNEY:

Feb. 17, 1953     W. H. SCRIBNER     2,628,376
EGG WASHER AND DRIER
Filed Oct. 22, 1949     4 Sheets-Sheet 2

INVENTOR
WILLIAM HARRY SCRIBNER
BY
ATTORNEY

Feb. 17, 1953 W. H. SCRIBNER 2,628,376
EGG WASHER AND DRIER
Filed Oct. 22, 1949 4 Sheets-Sheet 3
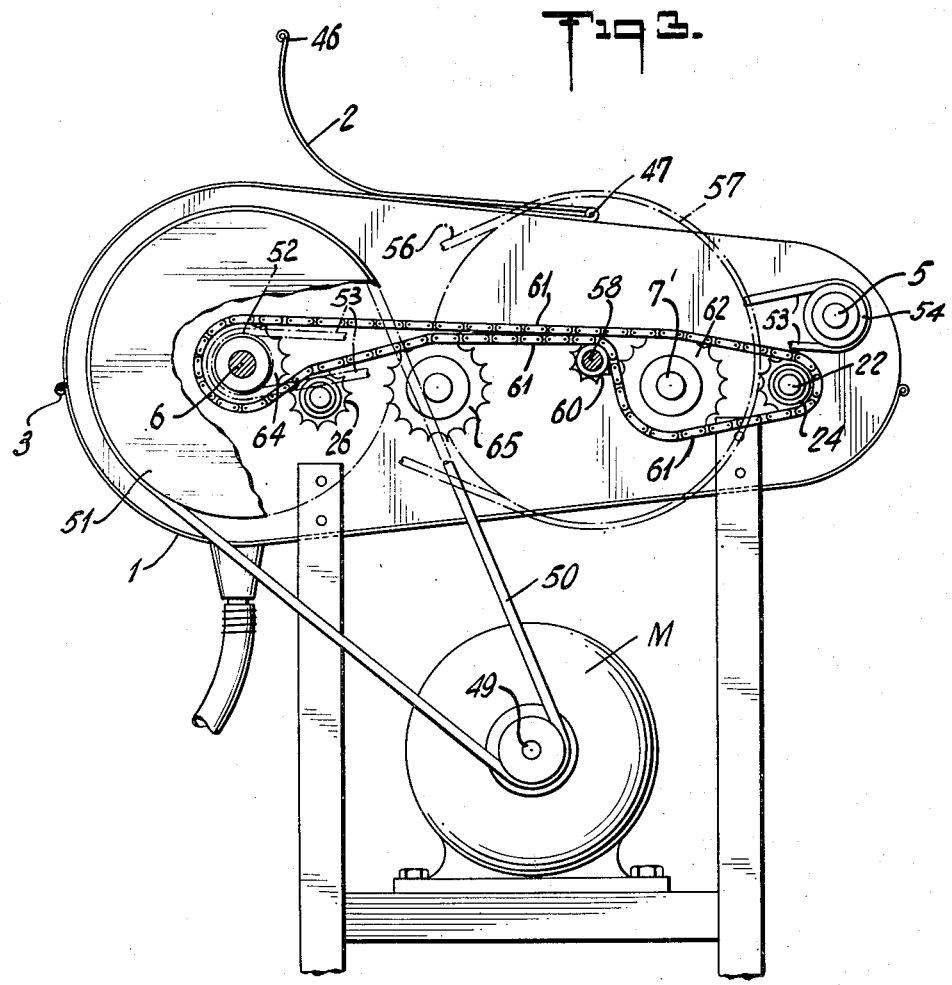
Fig. 3.
Fig. 4.
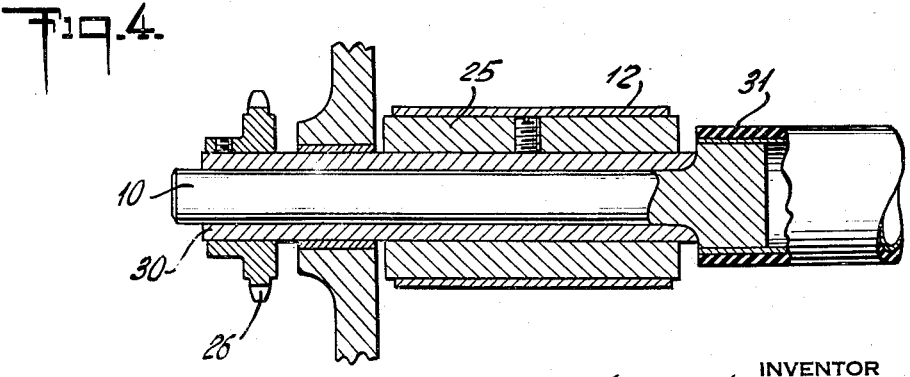
INVENTOR
WILLIAM HARRY SCRIBNER.
BY
ATTORNEY Feb. 17, 1953 W. H. SCRIBNER 2,628,376
EGG WASHER AND DRIER
Filed Oct. 22, 1949 4 Sheets-Sheet 4

INVENTOR
WILLIAM HARRY SCRIBNER.
BY
Robert V. Morse
ATTORNEY

Patented Feb. 17, 1953

2,628,376

UNITED STATES PATENT OFFICE 2,628,376

EGG WASHER AND DRIER

William Harry Scribner, Tompkins County, N. Y.

Application October 22, 1949, Serial No. 122,909

6 Claims. (Cl. 15—3.14)

This invention relates to the cleaning of eggs, including washing and drying them preparatory to marketing. This cleaning must normally be done at the farm, and it is an arduous chore when done by hand, so that various machines have been developed to relieve the farmer of such work. Eggs from the nest are often quite dirty and require vigorous scrubbing, while on the other hand they are naturally fragile so that machines such as those used to clean citrous fruit for example are too severe in their action. Instead of bristles or scrubbing disks, the present invention uses a flapping action of flat strips or sheets which tend to partly wrap around the eggs like a whip and then draw off with a rubbing action. This type of contact has been found effective for both washing and drying. While the action is vigorous, it is sufficiently light so as not to damage the eggs.

Other distinguishing features of the invention are the conveying mechanism, which is light, durable and easily cleaned; the driving mechanism; the water system; the adjustable case; and various other improvements as will become apparent as the description proceeds. Extensive tests have shown the machine to be capable of cleaning large numbers of eggs at a satisfactory rate. The machine is sufficiently simple to bring it within the cost that an average poultry producer can afford.

Referring now to the drawings forming part of this specification,

Fig. 3 is another end view seen from the left hand side of Fig. 1, taken on the line 3—3 of Fig. 1, omitting some parts of the belt drives for clearness, and showing more specifically the arrangement of the chain drive and sprockets.

Fig. 4 is a detail cross-section taken on the line 4—4 of Fig. 1 showing how the sprocket driven conveyor belt pulley is mounted on a sleeve on the non-rotating guide rod.

Similar reference numerals refer to similar parts thruout the various views.

Figure 1:
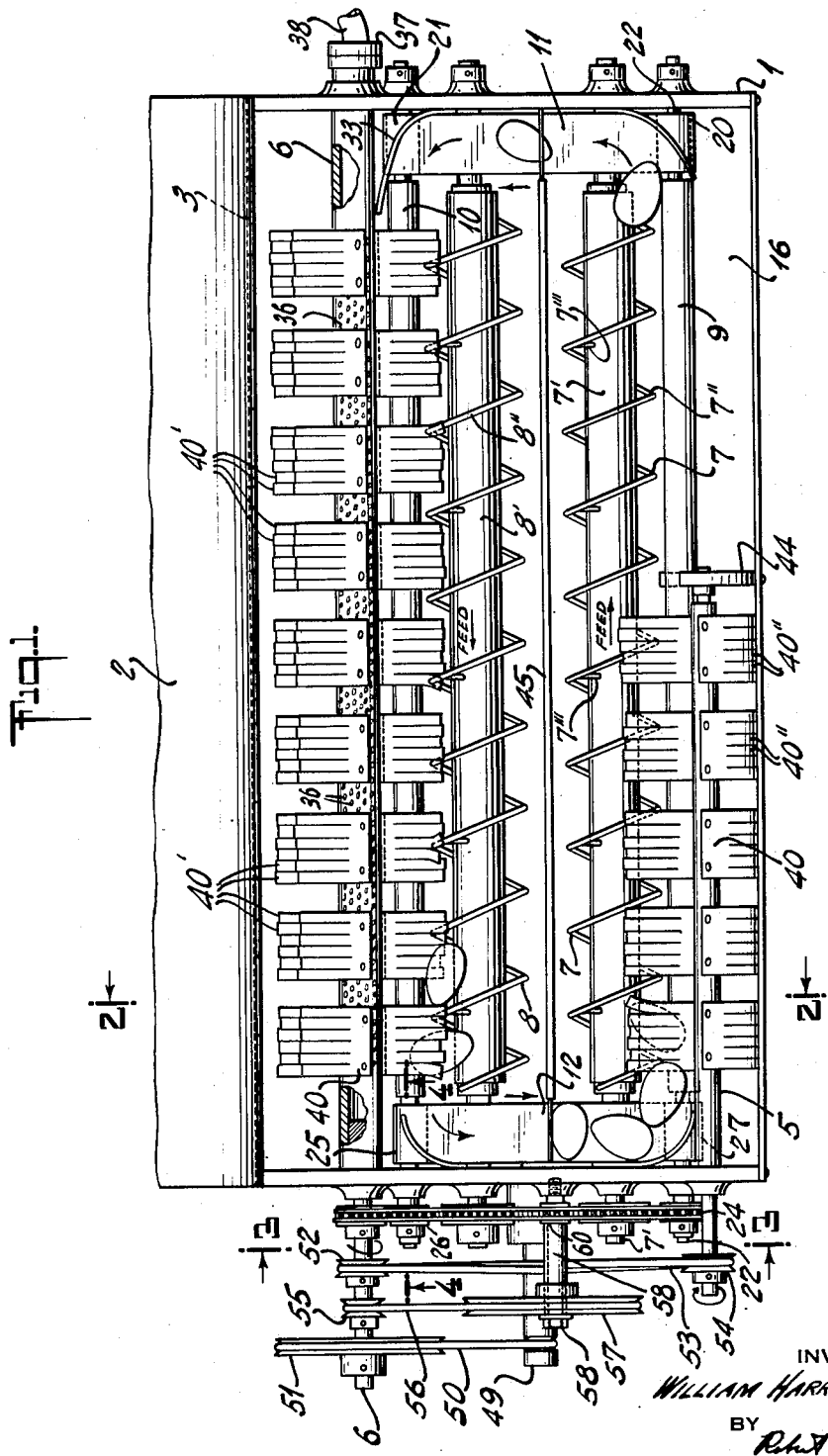
Fig. 1 is a plan view of the egg washer and drier with the cover open to show the interior mechanism.

Referring now to Fig. 1, the egg washing and drying mechanism is principally mounted in a frame or casing 1 having a cover 2 hinged to the casing at 3 (see Fig. 2) and shown thrown back in Fig. 1 so as to expose the operating parts. These are supplied with power thru chain and belt drives shown at the left end of Fig. 1, which are there uncovered for clearness in the drawing, but which in practice are generally enclosed in a removable case for safety and cleanliness. These power drives will be more particularly described in connection with Fig. 2 and Fig. 3.

Returning to the interior mechanism within the casing 1, its principal elements are two flapper shafts 5 and 6, two helical conveyors 7 and 8, two guide rods 9 and 10, and two transverse belt conveyors 11 and 12. The helical conveyors 7 and 8 carry the eggs longitudinally along the guide rods 9 and 10 where they are slapped and rubbed by the flexible straps 40 on the flapper shafts 5 and 6. The belt conveyors 11 and 12 serve to transfer the eggs across from one side of the machine to the other, or from one helical conveyor to the other.

Taking up the interior mechanism more in detail, the unwashed eggs are placed in the machine at the right hand lower portion of Fig. 1, indicated in general by the numeral 16, where there is only the stationary guide rod 9 and the helical conveyor 7 to move the eggs along to the right. The guide rod 9 is similar to the guide rod 10, does not turn, and is provided with a rubber covering 31 as shown at the right in Fig. 4. The eggs roll or rub along the guide rods 9 and 10 impelled by the helical conveyors 7 and 8. These helical conveyors are of a novel construction characterized by lightness, cleanliness, strength and flexibility.

The helical conveyor 7 for example consists of a central rotating shaft 7' to which is secured at each end a long helical spring wire 7'' which stands clear of the shaft 7' except for occasional spokes 7'''. This conveyor extends sufficiently close to the guide rod 9 so that any egg thereon will be pushed along as the helical wire 7'' rotates. The helical wire 8'' on the shaft 8' is similarly arranged, except that the shafts 7' and 8' turn in opposite directions (see Fig. 3) so that the conveyor 7 feeds to the right in Fig. 1 and the conveyor 8 feeds to the left, as indicated by the arrows.

Eggs put in at 16 and moved to the right by the conveyor 7 as described are thus pushed off on to the cross-conveyor 11, which is of the flat belt type, running between the pulleys 20 and 21. The pulley 20 is the driving pulley and is rotated by a shaft 22 extending the length of the machine inside of the hollow fixed guide rod 9 to the chain driven sprocket 24 at the left hand end. The pulley 21 at the other end of the belt 11 is an idler. The belt conveyor 12 at the left side of the machine is similar, except that it runs in the opposite direction, being driven thru the pulley 25 by the sprocket 26, which turns oppositely to the sprocket 24 as shown in Fig. 3, and the pulley 27 is an idler. This construction will be evident from Fig. 4, which shows both the sprockets 26 and the conveyor pulley 25 keyed to the same rotating sleeve 30, which turns freely on the stationary guide rod 10, most of which is constructed as a tube covered with rubber 31 to cushion the eggs. The construction of the guide rod 9 is similar, except that the drive shaft 22 extends thru the tube 9 the length of the machine to the driving conveyor pulley 20 as previously described.

The eggs having been put in at 16, conveyed to the right in Fig. 1 by the helical conveyor 7 and across by the belt conveyor 11, are then turned by the deflector 33 into the second helical conveyor 8 which feeds them along the guide rod 10 to the left in Fig. 1 for the length of the machine. During this period the washing of the egg occurs and is effectuated in the following manner.

A hollow rotating shaft 6 provided with spray holes 36 is connected at the right thru a swivel coupling 37 to a hose 38 by which warm water may be supplied to the hollow shaft 6 and spray out thru the holes 36 to wet the eggs as they pass along the conveyor 8. Also secured to this same hollow shaft 6 are sheets of flexible material 40 preferably slit into straps 40' which flap around as the shaft 6 rotates and whip against the eggs, though without sufficient force to damage them. This results in a peculiar action which has been found to be effective in both washing and drying the eggs. The washing occurs on the side we are now considering, where the eggs are wet from the water spray from the holes 36, but a similar slapping action on the other side of the machine at the conveyor 7, where there is no water supplied, serves to dry them.

Figure 2:
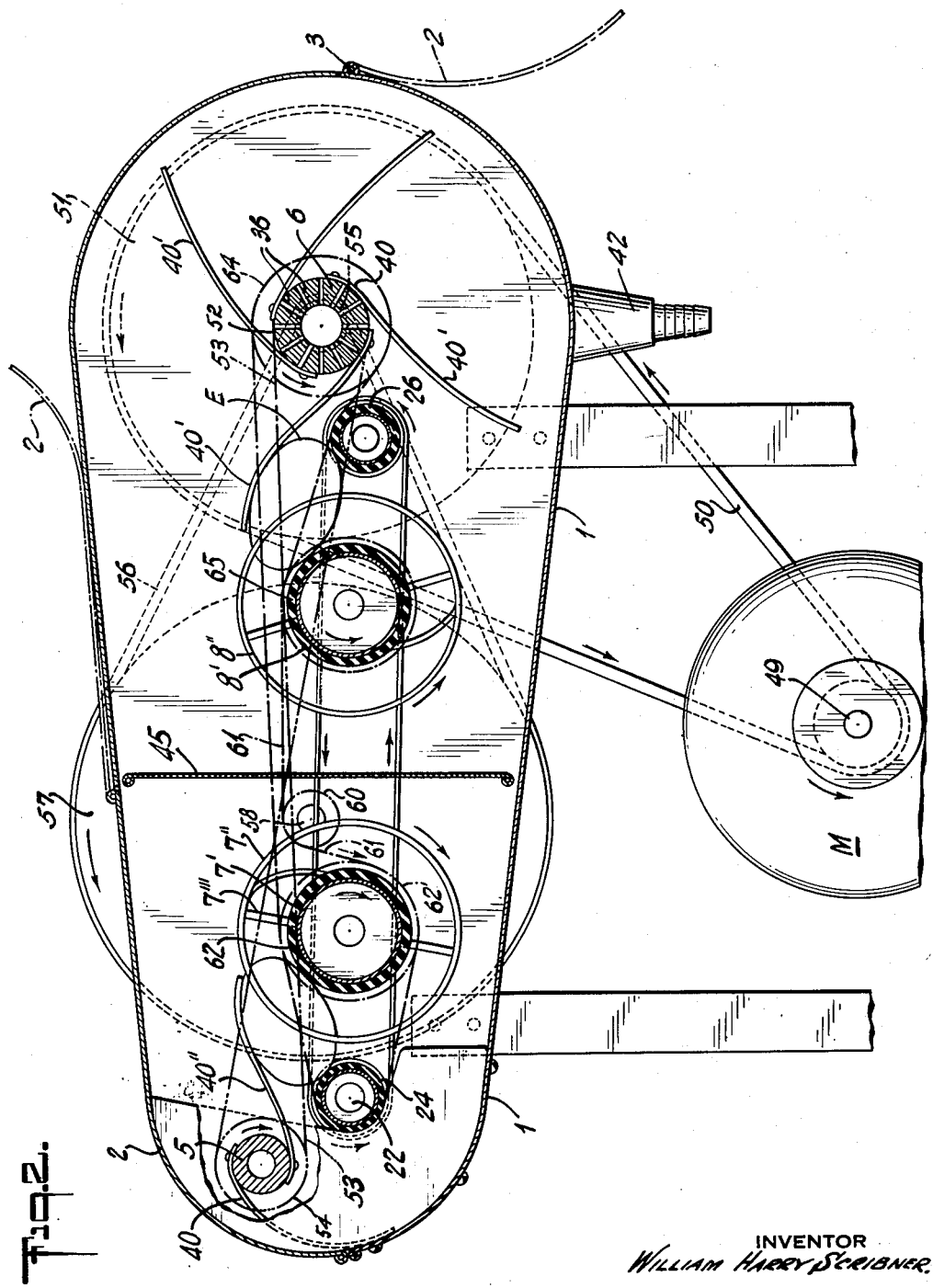
Fig. 2 is a diagrammatic view of the power drives as seen from the left hand side of Fig. 1.

An analysis of the action of the slapping straps is best seen in Fig. 2, where the washing side is on the right and the drying side on the left. On the right or washing side it will be noted that the straps 40' on the spray shaft 6 fly out tangentially as the shaft 6 rotates, and when they strike the egg E they tend to wrap or curl around it like a whip, clinging closely to its surface in whatever position it may be. Then as the rotation of the shaft continues, the straps 40' are dragged across the egg with a rubbing action which is very effective in loosening and removing any dirt that may be on the egg. On the drying side, at the left in Fig. 2, this same wrapping and rubbing action has been found to be effective in removing the water, though in that case the water has to be removed from the straps 40" on the rotating shaft 5. This is accomplished by having the straps 40" strike the casing 1 or cover 2 as they complete a revolution so that the water is knocked off and runs down the bottom of the casing to drain pipe 42. This, together with the normal centrifugal drying effect, keeps the straps 40" sufficiently dry to function effectively.

The straps 40' and 40" are of rubber or equivalent flexible material such as artificial rubber, plastic, fabric (including thin metal fabrics) or leather, and the slapping action described obviates the need for a separate type of drying apparatus, thus simplifying the manufacture as well as improving the action.

Returning now to Fig. 1, the eggs washed as described in their travel along the helical conveyor 8 finally reach the left end where they are deflected on to the belt conveyor 12 which carries them as indicated by the arrow back across to the helical conveyor 7 first described, which moves them to the right in Fig. 1. Here they are exposed to the action of the flapping straps 40" on the rotating shaft 5, which extends part way along the machine and is journaled at its other end in the support 44. The flapping straps 40" remove the water as previously described and leave the eggs dry enough to be removed from the machine. Any slight dampness disappears immediately in a normal atmosphere, though in very humid conditions supplementary drying, such as warm air blasts or towelling may be added if necessary. The cleaned and dry eggs are thus taken off at about the same point 16 where the unwashed ones are put on, so that one person can easily operate the machine. If dirt is observed remaining on one of the eggs after one traverse, the egg is merely allowed to go thru the machine a second time; but aside from exceptional cases one trip thru is sufficient.

A partition 45 separates the washing side from the loading and drying side, and keeps the water from flying in the operator's face. When in action, the hinged cover 2 is folded half way back so as to open the drying and loading side to the operator while protecting him from the water in the washing side. The washing action can be observed, however, by looking in from either side under the cover if it is looped up, that is, with the free edge 46 placed at the intermediate hinge joint 47 in Fig. 3, instead of the free edge lying back as there shown. In general the operating position has the portions of the machine having rotating straps enclosed by the case or cover, leaving only the portion 16 (Fig. 1) open to put in and take out the eggs.

The chain and belt drives for supplying power to the various rotating shafts required in the machine are shown at the left in Fig. 1 and in greater detail in Fig. 2 and Fig. 3. These power drives are traced out diagrammatically in Fig. 2, in which according to the legend thereon the chain drives are shown in dot-and-dash lines and the crossed-belt drive in dash-and-double-dot lines. The ordinary V belts, such as from the motor and the first belt reduction, are in double lines.

Referring now to Fig. 2, the source of power, which may be any rotating shaft, is illustrated as the motor M having a shaft 49, driving an ordinary round or V belt 50 to the large belt pulley 51 on the shaft 6 which rotates the slapping straps 40. A smaller belt pulley 52 on the shaft 6 drives a crossed-belt 53 which runs to the pulley 54 driving the slapper shaft 5, so that it rotates in a direction opposite to that of the shaft 6, in both cases the straps 40' and 40" turning down on the eggs.

Also mounted on the shaft 6 is a smaller belt pulley 55 (dotted in Fig. 2, see also Fig. 1) which thru the second belt 56 drives the next large belt wheel 57 on the stub shaft 58. The pulleys and belts 50, 51, 55, 56 and 57 comprise a double reduction drive between the motor M and the stub shaft 58.

This stub shaft 58 is the primary shaft for the chain drive system, as it carries the driving sprocket 60 shown in dot-and-dash in Fig. 2, but more clearly in Fig. 3, which is devoted principally to the chain drive system, with the belts only partially indicated. This chain drive system starts with the driving sprocket 60 from which the chain 61 passes down around the lower part of the larger sprocket 62, driving the shaft 7' of the helical conveyor 7, and then around the sprocket 24 driving the shaft 22 of the pulley 20 of the belt conveyor 11. The chain 61 then returns around the other (upper) side of the sprocket 62 above mentioned, (thus driving it from both sides), and continues on to the idler pulley 64 which turns freely on the shaft 6. Returning, the chain 61 passes over the smaller sprocket 26 driving the pulley 25 of the belt conveyor 12. The chain 61 then continues over the sprocket 65 which turns the helical conveyor 8 where the washing occurs, and from the sprocket 65 back to the driving sprocket 60, the place of beginning.

It will thus be seen that the higher speed flapping strap shafts are driven by belt drives and the conveyors are driven by the chain drive, which is powered thru double reduction belts.

Figure 5:
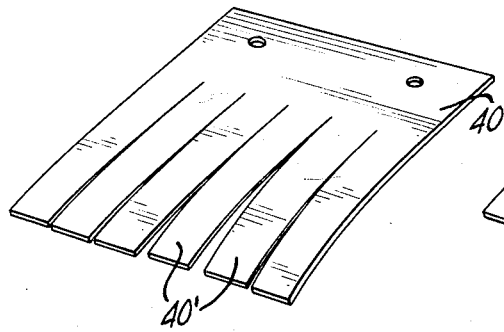
Fig. 5, Fig. 6, Fig. 7 and Fig. 8 illustrate various forms of the flapper straps or sheets which are slapped around the eggs and drawn off with a rubbing motion to wash and dry them.
Figure 6:
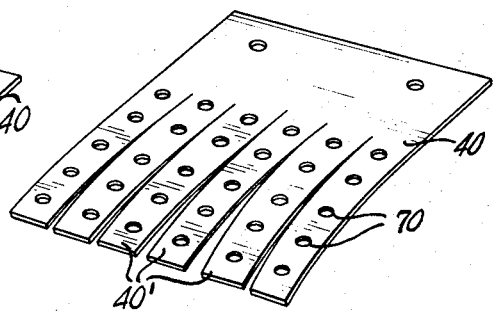
Figure 7:
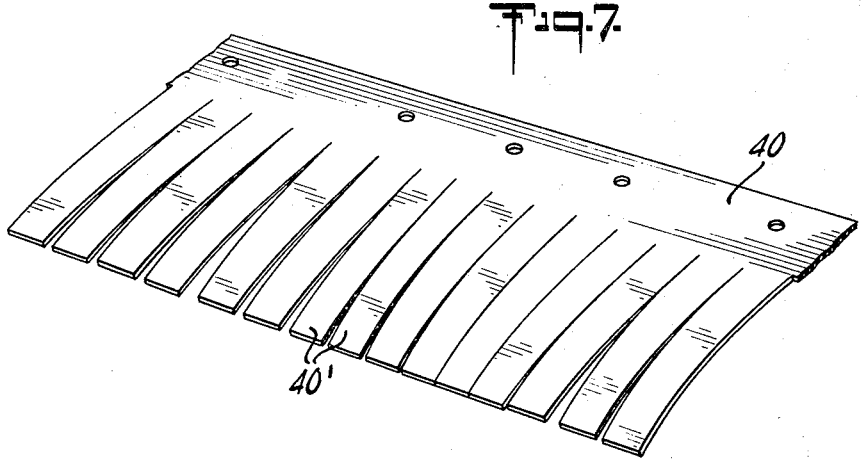
Figure 8:
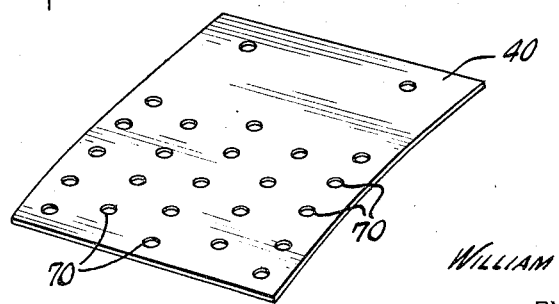

The washing and drying flappers may be made of various materials as described, and can take various forms as shown in Fig. 5, Fig. 6, Fig. 7 and Fig. 8. They are generally made from a sheet of rubber 40 slit into straps or fingers 40' or 40", as shown in Fig. 5, Fig. 6 and Fig. 7, with the back edge unslit so as to be easy to rivet or attach to the rotating shafts. The straps 40' and 40" may be individually mounted, or in shorter or longer groups as shown in Fig. 5 and Fig. 7, a little spacing between the groups in the machine appearing to be desirable to assist the egg to turn or change position as it goes thru. The reference numeral 40' is used in Fig. 5, Fig. 6, Fig. 7 and Fig. 8, but it will be understood that the drying straps 40" are similar. Holes 70 may be used in the straps as shown in Fig. 6, or broader flaps may be used as shown in Fig. 8. The essential feature in all cases with this invention is that the flapping material be flexible enough to slap the eggs with a wrapping action and then draw across with a rubbing action while in extended contact with the egg. This is quite different from merely rubbing or scrubbing the egg.

The machine is adapted to clean the eggs at about the rate that a person can conveniently handle them, the operator putting in a few, and then as they disappear into the washer, taking out an equivalent number that appear out of the drier. By the time that he has placed the clean ones in their container, it is about time to put another handful of unwashed eggs into the conveyor. With this steady and easy operation a large number of eggs can be passed thru the machine in a relatively short space of time as compared with the ordinary methods of scrubbing by hand.

While I have in the foregoing described certain specific forms by way of example, it will be understood that they are merely for purposes of illustration to make clear the principles of the invention, which is not limited to the particular forms shown but is susceptible to various modifications and adaptations in different installations as will be apparent to those skilled in the art without departing from the scope of the invention as stated in the following claims.

I claim:

1. In an egg cleaning machine, the combination of a rotary shaft, sheets of flexible material secured to the shaft at one end of the sheets and the other end free to serve as flappers to strike the egg with a whip and draw motion so as to rub it, said flappers being arranged in groups along the shaft with spaces in between the groups to facilitate turning of the egg, a sprinkler for wetting the flappers and eggs to be washed, and a conveyor for carrying the egg along within striking distance of the rotating flappers.

2. In an egg cleaning machine, the combination of a hollow rotary shaft having holes in its side to act as a sprinkler head, a water supply for said head, sheets of flexible material secured to the shaft at one end of the sheets and the other end free to serve as flappers to strike the egg with a whip and draw action so as to rub it while wet with a rotary spray from the shaft, and a conveyor for carrying the egg along within striking distance of the rotating flappers.

3. In an egg cleaning machine, the combination of a rotating shaft, sheets of flexible material secured to the shaft at one end of the sheets and the other end free to serve as flappers to strike the egg with a whip and draw action so as to rub it, a conveyor comprising a second shaft, a wire extending helically around said second shaft and being fastened thereto so as to turn with said second shaft, adjacent turns of the helical wire being spaced to form egg receiving pockets, and a guide adjacent to the helical wire so that rotation of the second shaft will cause the helical wire to push the egg along within striking distance of the rotating flappers.

4. In an egg cleaning machine, the combination of a rotating shaft, flexible washing flappers attached at one end to said shaft and the other end free to strike the egg with a whip and draw action so as to rub it, a sprinkler for wetting the egg, a wet egg conveyor for carrying the egg along within striking distance of said flappers, a second series of flappers for drying the egg, a second shaft for rotating said drying flappers, a wall within striking distance of the second series of flappers so as to remove some of the water from the drying flappers during part of their rotation, a conveyor for moving the drying egg along within striking distance of the second series of flappers, and a cross-conveyor between the first two conveyors for transferring the egg from the wet egg conveyor to the drying egg conveyor.

5. In an egg cleaning machine, the combination of a rotating shaft, flexible washing flappers attached at one end to said shaft and the other end free to strike the egg with a whip and draw action so as to rub it, a sprinkler for wetting the egg, a wet egg conveyor for carrying the egg along within striking distance of said flappers, a second series of flappers for drying the egg, a second shaft for rotating said drying flappers, a conveyor for moving the drying egg along within striking distance of the second series of flappers, a cross-conveyor between the first two conveyors for transferring the egg from the wet egg conveyor to the drying egg conveyor, a casing for the machine standing free of the washing flappers but located sufficiently close to the drying flappers so that they will strike it during part of their rotation to remove water therefrom, said casing being hinged at the top and at the side, and a partition between the two conveyors.

6. In an egg cleaning machine, the combination of a rotating shaft and cleaning elements attached thereto comprising flat sheet strips of thin flexible material secured at one end to the rotating shaft and free at the other end to slap the egg, said strips being arranged in spaced groups along the shaft to facilitate turning of the egg between the groups, and a conveyor for moving the egg along thru the groups parallel to the shaft.

WILLIAM HARRY SCRIBNER.

REFERENCES CITED

The following references are of record in the file of this patent:

UNITED STATES PATENTS

| Number | Name | Date |
|---|---|---|
| 1,050,298 | Rowland | Jan. 14, 1913 |
| 1,763,883 | Colvin | June 17, 1930 |
| 1,873,832 | Farley | Aug. 23, 1932 |
| 2,102,758 | Spayd | Dec. 21, 1937 |
| 2,234,766 | Kennedy | Mar. 11, 1941 |
| 2,438,666 | Hodson | Mar. 30, 1948 |

FOREIGN PATENTS

| Number | Country | Date |
|---|---|---|
| 758,340 | France | Nov. 3, 1933 |